Dec. 11, 1928.
C. C. HANSEN
1,694,380
CHUCK FOR CRANK HANDLES
Filed Oct. 5, 1927
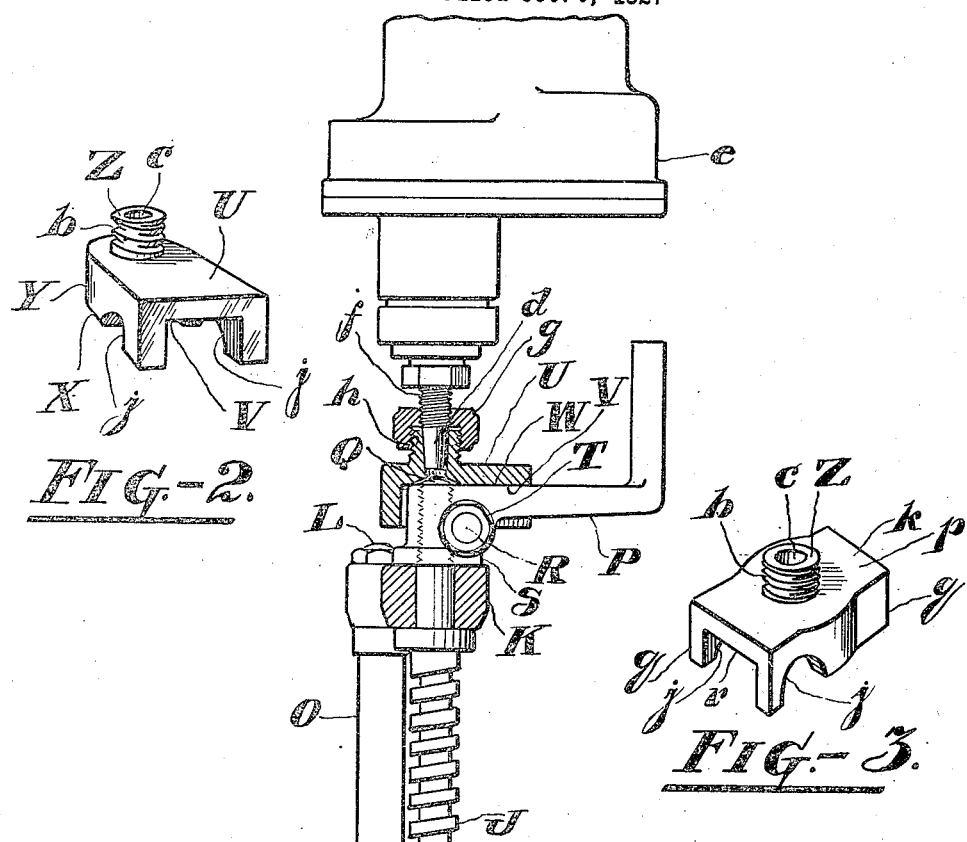
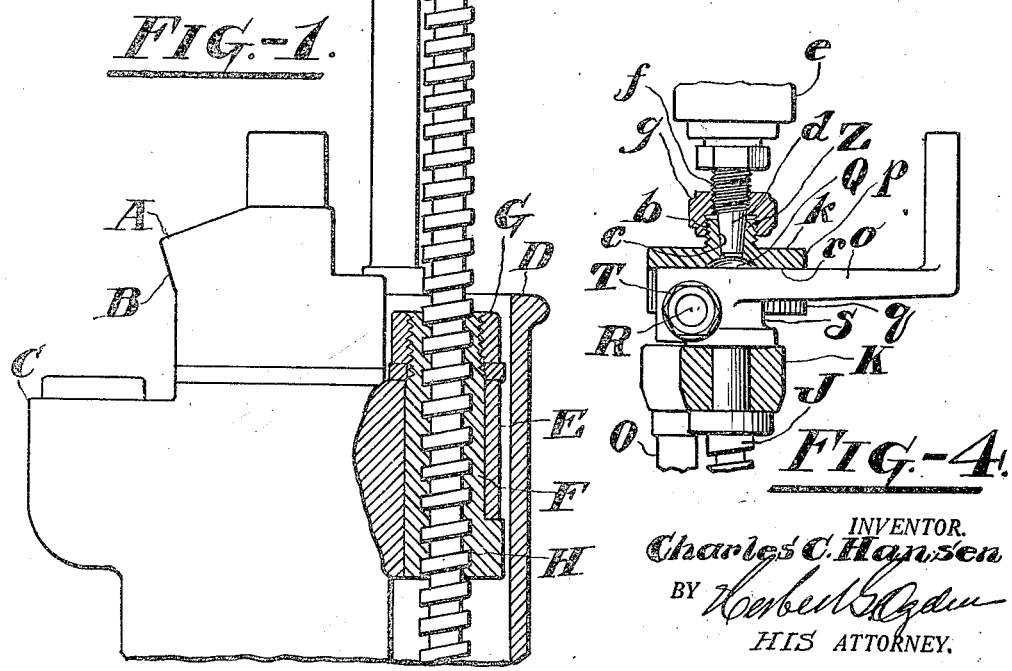
INVENTOR.
Charles C. Hansen
BY Herbert G. Ogden
HIS ATTORNEY.

Patented Dec. 11, 1928.

1,694,380

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CHUCK FOR CRANK HANDLES.

Application filed October 5, 1927. Serial No. 224,164.

This invention relates to rock drills, but more particularly to a chuck adapted to be attached on the feed screw crank handle of the drill in order to expedite the operation of withdrawing the drill from the drill hole.

Other objects will be in part obvious and in part pointed out hereinafter.

In the drawings illustrating a practical application of the invention,

Figure 1 is an elevation partly in section of the rearward end of a rock drill illustrating the manner in which the feed screw of a rock drill may be rotated by means of a rotary power motor connected to the crank handle by a chuck constructed in accordance with the practice of the invention, Figure 2 is a perspective view of the chuck, Figure 3 is a similar view of a modification of the invention, and Figure 4 is a view similar to Figure 1 illustrating an application of the modified chuck.

Referring to the drawings, A generally designates a drifter, only the back head B and a portion of the cylinder C of which are shown for illustrative purposes. The drifter A in common with drills of this type is intended to be supported by a shell D of any suitable type which in turn may be secured to a column or other support in a well known manner. The cylinder C has the usual feed screw lug T in which is disposed a feed screw nut F held in position in the lug E by a nut G.

Within the feed nut F are formed threads H for cooperation with a feed screw J whereby the drifter A may be actuated longitudinally of the shell D. A bearing is provided for the rearward end of the feed screw J in the form of a cross head K supported by rods L which may be secured to the rearward end of the shell D in any suitable manner. Preferably spacers O are disposed on the rods L to abut the rearward end of the shell D and the front end of the cross head K for spacing the cross head with respect to the shell.

The usual means provided for manipulating the feed screw J consists of a crank handle P threaded on a rearward projecting threaded end Q of the feed screw J. Additional clamping means are provided for preventing unscrewing of the crank handle P from the projection Q. These means in the present instance consists of a bolt R which projects through the hub portion S of the crank handle P and a nut T screwed on the bolt R to produce a clamping effect on the hub S. The hub S as is customary may be provided with a longitudinal slot (not shown) to enable the hub to be drawn tightly on the end Q of the feed screw.

In accordance with the present invention, means are provided for enabling the substitution of suitable power devices for manual power to rotate the feed screw J, particularly for rotating the feed screw in the direction necessary to retract the drifter A whenever it becomes necessary to substitute drill steels of greater length for those of shorter length previously used to advance the drill hole. These means are in the form of a chuck and preferably consists of a plate U having an inner surface V adapted to lie on a rearward surface W of the crank handle P.

Adjacent the sides of the inner surface V are lateral walls X which are preferably so spaced with respect to each other as to substantially equal the width of the crank handle P. The lateral walls X may be slidably placed over the butt end of the crank P and may be slidably removed therefrom without the insertion or removal of bolts or other securing means which, in the operative position of the chuck, is intended to extend slidably between the walls X. The walls X are preferably united by a cylindrical end wall Y shaped to conform substantially to the contour of the hub S of the crank handle.

On the rearward end of the plate U is an integral projection Z exteriorly threaded as at $b$ and having a socket $c$, in this instance a tapered socket, for the reception of a correspondingly formed spindle $d$ carried by a power device such as a rotary drill $e$. The spindle $d$, as is customary, has the usual threaded portion $f$ whereon is threaded a chuck $g$ for connecting the spindle to a tool or other device intended to be rotated by the rotary drill $e$. The chuck $g$ of course is also provided with internal threads $h$ in its front end and these threads engage those of the projection Z to secure the plate U to the spindle $d$.

In order to enable the plate U to be suitably located on the crank handle P, that is, that the plate U will be properly centralized with the feed screw J, thus bringing the axis of he spindle $d$ in axial alignment with that of the feed screw J. The lateral walls X are provided with recesses $j$ of suitable proportions and shape to partly surround and engage the head of the bolt R and also the nut T. The recesses $j$ may lie in the same transverse plane and of course may also vary as to size, depending upon the size of the nut T and the head of the bolt R.

The modification shown in Figures 3 and 4 illustrates a chuck $k$ adapted to be applied to a crank handle $o$ in which the clamping bolt R extends through the outward portion of the hub S and on the side of the feed screw J opposite to that of the juncture of the hub S and the crank portion of the crank handle $o$. The chuck $k$ comprises a plate $p$ of generally rectangular form and integral side walls $q$ disposed laterally with respect to the plate $p$. The walls $q$ may be suitably spaced with respect to each other to permit the entrance of the crank handle $o$, the rearward surface of which is intended to bear against an inner surface $r$ of the plate $p$. Near one end of the walls $q$ are formed the recesses $j$ for engagement with the head of the bolt R and with the nut T to locate the chuck $k$ in a position necessary to maintain the spindle $d$ in axial alignment with the feed screw J.

In the drawings only a few modifications which the invention may assume are shown to illustrate the manner in which the invention may be modified to accommodate various types of feed screw crank handles. It is to be understood, however, that the invention is susceptible of still further modification to suit the particular design of the crank handle to which the chuck may be applied, as well as such prominences, their form and location, whereby the chuck is centralized with respect to the feed screw.

In practice, the chuck may be disposed on the spindle $d$ of the rotary drill $e$ and may be drawn thereon and secured firmly in position by the chuck $g$ threaded on the projection. The device will then be in readiness for application to the crank handle to rotate the feed screw $j$ in a reverse direction for retracting the drifter A from the work.

The withdrawal of the drifter may be quickly accomplisher by means of the present invention. This is a favorable advantage, particularly in large drilling operations in which the time ordinarily expended for retracting the drifter by manual rotation of the feed screw J lowers the total drilling in a given period of time considerably below what might otherwise be obtained.

An idea of the amount of time which is thus consumed may be readily formed when it is understood that the usual type of drill steel used in drifters permit of only a depth of two feet of drilling per steel. This limitation necessitates frequent changes of steel and a consequent wastage of time equalling substantially that required for driving the drill steel into the work. It can therefore readily be seen that the efficiency of a drill can be considerably increased by means of the present invention which enables the drifter to be retracted in the shell with a minimum expenditure of time.

I claim:

1. A chuck for crank handles, comprising a plate, means on the plate engaging portions of the crank handle, said means for permitting slidable placement of the chuck on, and slidable removal of the chuck from, the crank handle and for maintaining said plate in operative position on the crank handle, and means on the plate adapted to be connected to the chuck of a power device whereby the crank handle and the element normally actuated thereby are rotated.

2. A chuck for crank handles, comprising a plate, means on the plate for engaging the sides of the crank handle, said means also engaging the clamping screw of the crank handle to centralize the plate with respect to the element intended to be rotated, and means on the plate adapted to be connected to the chuck of a power device whereby the crank handle and the element normally actuated thereby are rotated.

3. A chuck for crank handles, comprising a plate, lateral walls on the plate for engaging the sides of the crank handle, said walls having recesses for the reception of the clamping screw of a crank handle to centralize the plate with respect to the element intended to be rotated, and a projection on the plate threaded for connection with the chuck of a power device whereby the crank handle and the element normally actuated thereby are rotated.

4. A chuck for crank handles, comprising a plate, lateral walls on one side of the plate engaging the crank handle, said walls having recesses for the reception of a prominence on the crank handle to maintain the plate in operative position with respect to the element intended to be rotated, and a projection on the plate threaded exteriorly for connection with the chuck of a power device whereby the crank handle and the element normally actuated thereby are rotated, said projection having a bore to receive the spindle of such power device.

In testimony whereof I have signed this specification.

CHARLES C. HANSEN.